A. SIMON.
PRESSURE OPERATING DEVICE.
APPLICATION FILED NOV. 4, 1909.
1,075,733.
Patented Oct. 14, 1913.
2 SHEETS—SHEET 1.
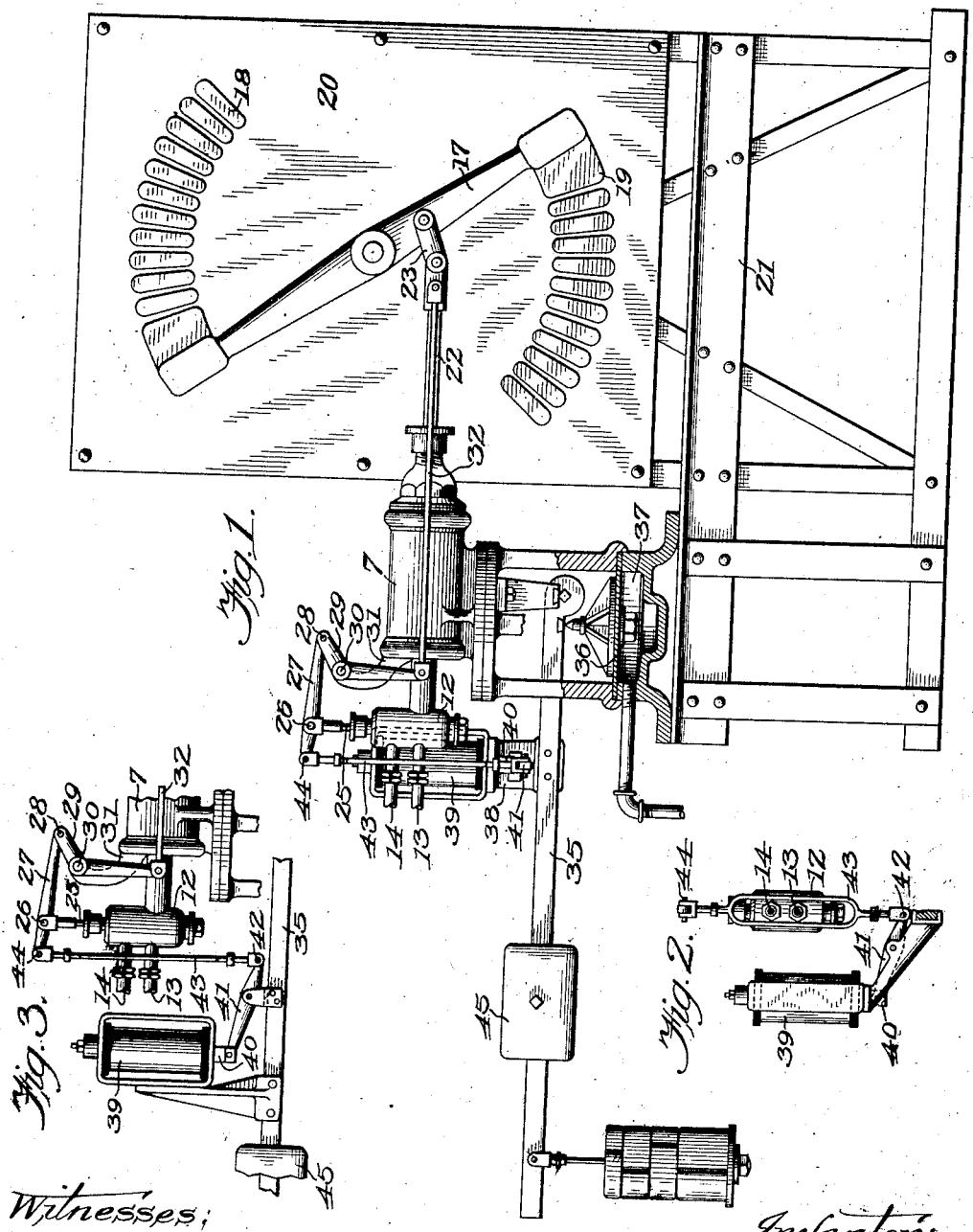

A. SIMON.
PRESSURE OPERATING DEVICE.
APPLICATION FILED NOV. 4, 1909.
1,075,733.
Patented Oct. 14, 1913.
2 SHEETS—SHEET 2.
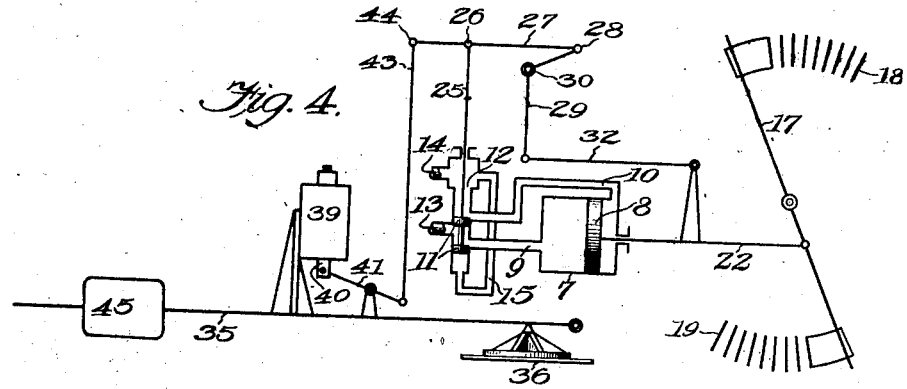
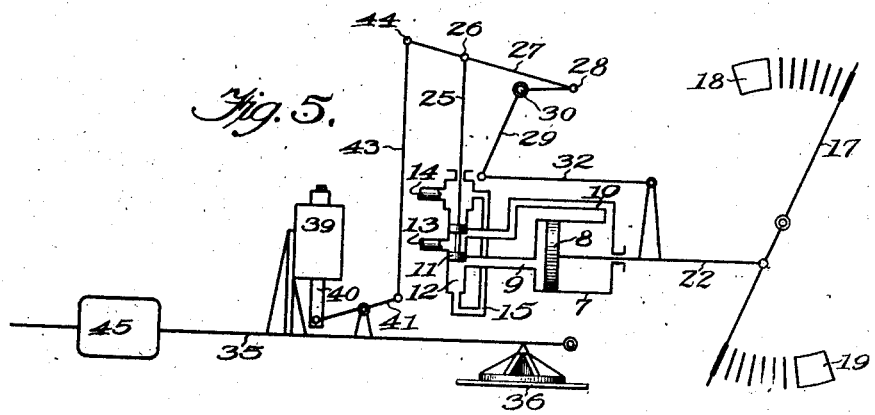
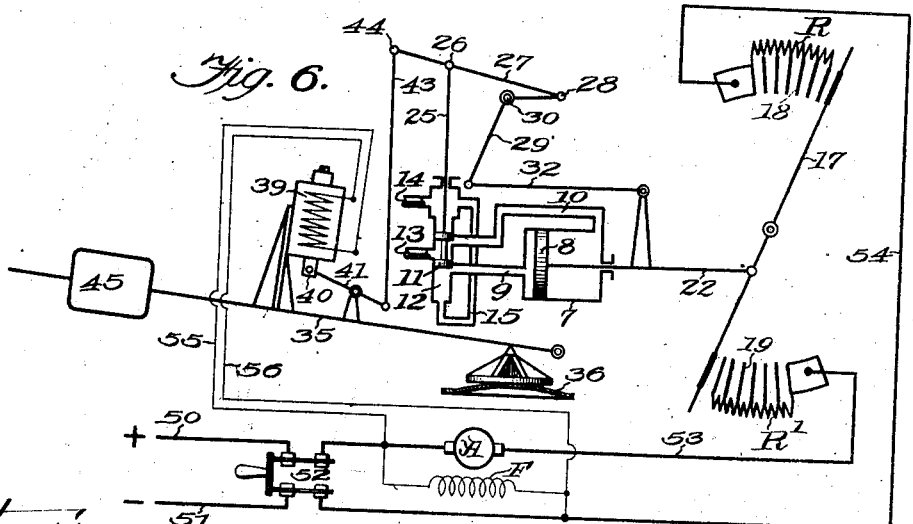
Witnesses:
George Haynes
J. W. Fitzgerald
Inventor:
Arthur Simon
By Edwin B. H. Tower Jr. Atty.

ved new and
UNITED STATES PATENT OFFICE.

ARTHUR SIMON, OF MILWAUKEE, WISCONSIN, ASSIGNOR TO THE CUTLER HAMMER MF'G. CO., OF MILWAUKEE, WISCONSIN, A CORPORATION OF WISCONSIN.

PRESSURE-OPERATING DEVICE.

1,075,733.  Specification of Letters Patent.  Patented Oct. 14, 1913.

Application filed November 4, 1909. Serial No. 526,187.

*To all whom it may concern:*

Be it known that I, ARTHUR SIMON, a citizen of the United States, residing at Milwaukee, in the county of Milwaukee and State of Wisconsin, have invented new and useful Improvements in Pressure-Operating Devices, of which the following is a full, clear, concise, and exact description, reference being had to the accompanying drawing, forming a part of this specification.

My invention relates to improvements in pressure operating devices.

My invention is particularly applicable to pressure devices used for operating motor controllers, but it should be understood that certain features thereof are applicable to pressure devices employed for various other purposes.

Where pressure actuated devices are used for either directly or indirectly controlling electric motors, if abnormal conditions occur at any time in the motor circuit, it is necessary to vary the conditions established by the pressure actuated device in order to protect the motor. Heretofore this has been accomplished by auxiliary protective means.

It is the object of my invention to provide means whereby, upon the occurrence of abnormal conditions in the motor circuit, the pressure device itself will automatically operate to establish conditions for the protection of the motor. For instance, if the pressure device operates a rheostat for controlling the motor, then upon the occurrence of abnormal conditions the pressure device will automatically operate the rheostat to insert sufficient resistance to protect the motor.

Various other objects and advantages of my invention will be hereinafter set forth.

In order to more clearly disclose the characteristic features of my invention, I shall describe the embodiment thereof illustrated in the accompanying drawings.

In the drawings, I have shown the pressure device employed for operating a controlling rheostat for an electric motor, but, as above set forth, the pressure device might be used to operate other mechanism without departing from the scope of my invention.

The views in the accompanying drawings are as follows:

Figure 1 is a front elevation of the mechanism, parts thereof being shown in section; Fig. 2 is a side elevation of a part of Fig. 1; Fig. 3 illustrates a slightly modified form of a portion of the device shown in Fig. 1; Figs. 4, 5 and 6 are schematic views of the device illustrated in Fig. 1, and Fig. 6 also includes a diagrammatic illustration of one circuit arrangement therefor.

The pressure device illustrated in Fig. 1 comprises a pressure cylinder 7, having a piston movable therein and provided with suitable inlet and outlet ports for admitting fluid under pressure thereto to operate the piston in either direction. In practice, the pressure device may be of any preferred construction, as, for instance, like that schematically illustrated in Figs. 4, 5 and 6.

Reference being had to Fig. 4, it will be seen that a piston 8 is arranged to slide within the cylinder and that fluid under pressure is adapted to enter said chamber at one end through a suitable passage or port 9, and at the other end thereof through a suitable passage or port 10. Each of the passages or ports 9 and 10 serves as an outlet for the fluid under pressure as well as for the admission thereof into the cylinder. The passages or ports 9 and 10 may be controlled by any suitable valve.

For the purpose of illustration, I have schematically shown a longitudinally movable valve 11 inclosed in a cylindrical casing 12. Communicating with the valve casing 12 are inlet and outlet ports 13 and 14 respectively for the admission and exhaust of fluid under pressure. The valve 11 is of such construction that when the same is in the position illustrated in Fig. 4, it will connect the passage 9 of the cylinder with the inlet port 13, and connect the passage 10 of the cylinder with the upper portion of its casing and thereby establish communication between the passage 10 and the outlet port 14. When the valve is moved in the opposite direction, it establishes communication between the inlet port 13 and the passage 10 of the cylinder and opens communication between the passage 9 in the cylinder and the lower part of its casing. Under these conditions, it is essential to provide some means for connecting the passage 9 to the outlet port 14, and to this end the bypass 15 is provided which connects the lower end of the valve casing to the upper end thereof, and, consequently, to the outer port 14.

With this arrangement, it will readily be seen that when the valve is moved downwardly, fluid will be admitted through the passage 9 to the cylinder to force the piston 8 forwardly, and that when the valve is moved upwardly, fluid will be admitted to the cylinder through the passage 10 to move the plunger 8 in an opposite direction.

As above stated, for the purpose of illustration, I have shown the pressure device connected to a rheostat. In practice, the rheostat might be of any preferred construction. As illustrated, it merely comprises a centrally pivoted contact member 17, the opposite ends of which are adapted to sweep over a series of contacts 18 and 19. The contact arm and the series of contacts may be mounted upon a suitable insulating panel 20 supported in any suitable manner as by means of a frame 21. The frame 21 may also be arranged to carry the pressure cylinder. The arm 17 of the rheostat may be connected to the piston rod 22 of the pressure device in any preferred manner as by means of a link 23. With this arrangement, it will be seen that reciprocation of the piston of the pressure device will move the contact arm back and forth over the series of contacts.

I shall now describe the operating mechanism for the valve 11. Connected to the valve is a rod 25 which projects through the top of the casing 12. The valve rod 25 is secured by a pivotal connection 26 to a lever
27. In practice, the lever 27 may have a fixed pivotal point; but, as illustrated, the same is pivoted at 28 to one arm of a bell crank lever 29. The bell crank lever 29 is pivoted at 30 to a stationary member 31, which, as illustrated, is secured to the pressure cylinder. The other arm of the bell crank lever is connected by means of a pitman 32 to the piston rod 22 of the pressure cylinder. With this arrangement, the bell crank lever varies the position of the fulcrum point of the lever 27 in accordance with the position of the rheostat arm 17 for the purpose hereinafter set forth. The free end of the lever 27 is connected in a manner hereinafter described to a pivoted operating member 35. The operating member 35 rests upon the diaphragm 36 of a pressure chamber 37 with the obvious result that when the pressure in the chamber 37 increases, the member 35 will be raised, and, when the pressure in the chamber 37 decreases, the member 35 will move downwardly. Fixed to the member 35 is a bracket 38 carrying an electromagnet 39 having a movable plunger 40. The bracket 38 also carries a lever 41 pivoted thereto intermediate of its ends as best illustrated in Fig. 2. One end of the lever 41 is pivoted to the plunger of the electromagnet 39, while the opposite end thereof is connected by a pin 42 to one end of a link or strap 43. The opposite end of the link 43 is connected by a pin 44 to the free end of the lever 27. With this arrangement, it will be seen that when the electromagnet is energized and draws its plunger upwardly, it thereby rocks the lever 41 to draw the lower end of the connecting link 43 toward the operating member 35. Hence, so long as the magnet 39 is maintained energized, it establishes a substantially rigid connection between the connecting link 43 and the operating member 35. In other words, so long as the magnet 39 is energized, the connecting link 43 will move with the operating member 35, thereby imparting movement from the operating member 35 to the lever 27, which, in turn, will raise or lower the valve in accordance with the movement of the member 35. On the other hand, if the magnet 39 is deënergized at any time, the plunger thereof will fall, thereby rocking the lever 41 in a manner to raise the connecting link 43. This, in turn, operates the lever 27 to raise the valve with the result heretofore mentioned.

The arrangement shown in Fig. 3 is substantially like that already described, with the exception that the electromagnet is mounted in a different position on the operating member 35, and the lever 41 is arranged in alinement with and supported directly by the operating member instead of being mounted on the bracket and extending at right angles to the operating member as in Fig. 1. This modification is shown to better illustrate the principle of the connection between the lever 27 and the operating member 35. As a matter of fact, the structure shown in Fig. 3 is exactly like that shown in Fig. 1, with the exceptions above noted. In practice, the arrangement shown in Fig. 1 is preferable inasmuch as it allows a greater range of movement of the adjustable weight 45 which is mounted on the member 35 for well known purposes.

I shall now briefly describe the operation of the device, reference being had to the schematic views.

Fig. 4 shows the electromagnet 39 energized and the diaphragm contracted. Consequently, the operating member 35 will be moved downwardly by the weights carried thereby until the valve 11 is moved into such a position that the fluid from the supply passage 13 will flow through the passage 9 into the pressure cylinder, thereby forcing the piston 8 forwardly or to the right. With the parts in the position just described, if at any time the electromagnet 39 is deënergized, the plunger thereof will drop, thereby moving the lever 41 into the position illustrated in Fig. 5. This results in raising the connecting link 43, thereby raising the free end of the lever 27, which, in turn, raises the valve 11. With the valve in this position, fluid will be admitted from the inlet port 13 through the passage 10 in the pressure cylinder, with the result that the piston is forced rearwardly or to the left.

In Fig. 6 the diaphragm is shown distended, with the result that the operating member 35 is raised, thereby raising the valve 11 with the result just described. Inasmuch as deënergization of the electromagnet 39 causes operation of the piston to the left, it will be seen that when the operating lever 35 is in the position shown in Fig. 6, deënergization of the electromagnet would have no effect upon the piston. However, with the electromagnet 39 deënergized, if the member 35 should descend, the valve would be maintained in raised position under the weight of the plunger of the electromagnet, and, consequently, the descent of the member 35 would have no effect on the valve. Hence, the piston would remain in the position illustrated. On the other hand, with the magnet energized, downward movement of the member 35 would draw the valve downward, thereby causing the piston to be again moved forwardly.

I shall now describe the circuit arrangement for the device as diagrammatically illustrated in Fig. 6. In this figure, the rheostat operated by the pressure device is arranged to control an electric motor having an armature A and a shunt field winding F. The rheostat is arranged to control resistances R and R' connected in series with the motor armature. Also the rheostat is so arranged that when the arm 17 thereof is in the position illustrated in Fig. 6, it opens the motor circuit. The electromagnet 39 is connected in circuit in a manner hereinafter set forth. To better understand the operation of the device, it may be assumed that it is desired to cause the motor to operate to maintain a substantially constant pressure in the device to which the diaphragm chamber 37 is connected, or to start and stop the motor upon predetermined variations of pressure in the device to which the diaphragm chamber is connected, whatever such device may be. It has already been explained that when the diaphragm chamber is distended, as shown in Fig. 6, the piston of the pressure cylinder will be moved to the left, thereby moving the rheostat arm to open the motor circuit. If, now, the pressure in the diaphragm chamber decreases, the operating member 35 will descend, thereby shifting the valve 11 until fluid under pressure is admitted to the cylinder from the rear end thereof; that is, assuming that the electromagnet 39 is maintained energized. As illustrated, the electromagnet 39 is connected directly across the motor circuit, and, consequently, so long as the voltage of the motor circuit remains normal, said magnet will be maintained energized. Upon forward movement of the piston of the pressure device under the conditions just described, the rheostat arm will be moved anti-clockwise. Initial movement of the contact arm 17 in this direction closes the motor circuit, which may be traced from main line 50, through main line switch 52 and motor armature A, by conductor 53, through the resistance R', through the contact arm 17 and resistance R, by conductor 54 and switch 52 to main line 51. Thereupon the motor is started with all the resistance included in circuit therewith. Continued movement of the piston of the pressure device, however, will operate said arm to gradually remove all resistance from the motor circuit. The circuit of the magnet 39 may be traced from main line 50, by conductor 55, through said magnet, by conductor 56 to main line 51. As already set forth, deënergization of the magnet 51 will cause the valve to be shifted to move the piston in an opposite direction to that just described. This, of course, results in moving the contact member 17 to reinsert the resistances R and R' in circuit and then open the motor circuit. Consequently, upon restoration of voltage, the motor cannot be started until the magnet 39 has responded to again shift the valve to cause the rheostat arm to be operated to start the motor in the usual manner. This arrangement, of course, fully protects the motor upon restoration of voltage and renders the restarting of the motor upon restoration of voltage entirely automatic.

In practice, it is desirable to employ the resistances R and R' to vary the speed of the motor in accordance with the pressure exerted on the diaphragm. That is to say, when the diaphragm is contracted, owing to low pressure in the chamber 37, it is desirable to operate the motor at a high speed and to operate the motor at a slower speed when the pressure on the diaphragm approaches a predetermined maximum. It is for the purpose of obtaining this speed regulation that I provide the bell crank lever 29 before referred to. The function of this lever is well understood to those skilled in the art, and, briefly stated, is to operate the valve by shifting the fulcrum point of the lever 27 when the rheostat arm has received a movement corresponding to the movement of the member 35 under the influence of the diaphragm. If it were not for the provision of this bell crank lever, or an equivalent means, upon movement of the valve the piston would be moved to its full extent, with the obvious result that the motor could not be maintained in operation at an intermediate speed.

Having thus described my invention, what I desire to secure by Letters Patent, is:—

1. The combination with a pressure actuated device of a pressure controlling valve therefor, an operating member for said valve, means mechanically connecting said valve with said operating member, but permitting movement of either relative to the other and an electromagnet adapted when energized to control said means to prevent relative movement between said operating member and said valve, and when deënergized to cause said valve to move to a predetermined position.

2. The combination with a pressure actuated device of a pressure controlling valve therefor, an operating member for said valve, a solenoid mounted upon said operating member, a mechanical connection between said operating member and said valve controlled by said solenoid, said solenoid when energized actuating said connections to bring said valve and said operating member into a fixed relation to cause movement of the latter to be directly imparted to the former, and when deënergized to actuate said valve through said connections independently of said operating member.

3. The combination with a pressure actuated device, of a pressure controlling valve therefor, an operating member for said valve, a solenoid carried by said operating member, connections between said operating member and said valve, including a member pivoted to said operating member, said solenoid having a plunger connected to said pivoted member to control the connections between said valve and said operating member.

4. The combination with a pressure actuated device, of a pressure controlling valve therefor, a pivoted operating lever for said valve, connections between said valve and said operating lever, including a member pivoted to said operating lever, and a solenoid carried by said operating lever and having a plunger connected to said pivoted member.

5. The combination with a pressure actuated device, of a pressure controlling valve therefor, a pivoted operating lever for said valve, a solenoid carried by said lever, a member pivoted upon said lever, one end of said member being connected to the plunger of said solenoid, and the other end thereof being operatively connected to said valve, said solenoid, when energized, being adapted to hold said pivoted member in a fixed relation to said operating lever, and, when deënergized, to cause said pivoted member to move said valve into a predetermined position irrespective of the position of said operating lever.

6. The combination with a motor controlling device, of a pressure device for operating the same, a pressure controlling valve for said pressure device, and an electromagnetic device associated with said valve and arranged, when deënergized, to cause said valve to be operated to insure the return of the motor controlling device to initial position.

7. The combination with a motor controlling device, of a pressure device for actuating the same, of a pressure controlling valve for said pressure device, an operating member for said valve, and electromagnetically controlled connections between said operating member and said valve for causing the operation of said valve to insure the return of the motor controlling device to initial position upon the occurrence of abnormal conditions in the motor circuit.

8. The combination with a motor controlling device, of a pressure device for actuating the same, a pressure controlling valve for said pressure device, an operating member for said valve, connections between said valve and said operating member, and an electromagnet controlling said connections and arranged to be deënergized upon the occurrence of abnormal conditions in the motor circuit to release said valve from said operating member to insure the return of the motor controlling device to initial position.

9. The combination with a motor controller, of a pressure device for actuating the same, a pressure controlling valve for said pressure device, an operating member for said valve, a pressure responsive device for actuating said operating member, and electromagnetically controlled connections between said operating member and said valve for causing operation of the valve upon occurrence of abnormal conditions in the motor circuit to insure the return of said motor controller to starting position irrespective of the position of said operating member.

10. The combination with a motor controller, of a pressure device for operating the same, a controlling valve for said pressure device, automatic means operating to different degrees to operate said valve, a connection between said valve and said controller for limiting the operation of said controller to a degree corresponding to the degree of operation of said automatic means, and an electromagnetically controlled connection between said valve and said automatic means adapted when deënergized to cause the return of said motor controller to initial position.

11. The combination with a motor controller, of a pressure device for operating the same, a controlling valve for said pressure device, an operating member for said valve movable to different degrees, a connection between said motor controller and said valve for automatically checking the operation of said controller when moved to a degree corresponding to the degree of movement of said valve operating member, and a connection between said valve and said operating member including a electromagnet adapted when deënergized to release said valve to cause the return of said motor controller to initial position.

12. The combination with a motor controller, of a fluid pressure device for operating the same, a valve controlling said fluid pressure device, a lever having a fixed fulcrum intermediate of its extremities, an operative connection between one end of said lever and a moving part of said motor controller, a second lever fulcrumed at one end to the free end of said former lever and connected intermediate of its ends to said valve, a third lever, an electromagnetically controlled connection between said third lever and the free end of said second lever to actuate said valve, said first lever also actuating said valve to check the operation of said motor controller upon movement to a degree corresponding to the degree of movement of said third lever.

In witness whereof, I have hereunto subscribed my name in the presence of two witnesses.

ARTHUR SIMON.

Witnesses:
 FRANK H. HUBBARD,
 S. W. FITZGERALD.